United States Patent [19]

Hofmann

[11] Patent Number: 4,592,246
[45] Date of Patent: Jun. 3, 1986

[54] INFINITELY VARIABLE TRANSMISSION

[76] Inventor: Detlev Hofmann, Hauptstr. 79, 7531 Kieselbronn, Fed. Rep. of Germany

[21] Appl. No.: 558,823

[22] Filed: Dec. 7, 1983

Related U.S. Application Data

[63] Continuation-in-part of Ser. No. 198,669, Oct. 20, 1980, abandoned.

[30] Foreign Application Priority Data

Oct. 18, 1979 [DE] Fed. Rep. of Germany ....... 2942076

[51] Int. Cl.[4] .............................................. F16H 15/00
[52] U.S. Cl. ........................................ 74/190; 74/198; 74/193
[58] Field of Search ................. 74/193, 198, 200, 191, 74/190, 207, 208, 209

[56] References Cited

U.S. PATENT DOCUMENTS 2,272,509  2/1942  Cavallo ................................. 74/193
2,730,904  1/1956  Rennerfelt ........................... 74/208
3,154,957  11/1964  Kashinara ............................. 74/198
4,061,045  12/1977  Kopp ..................................... 74/198

FOREIGN PATENT DOCUMENTS 721825  5/1942  Fed. Rep. of Germany ........ 74/193

Primary Examiner—Kenneth J. Dorner
Attorney, Agent, or Firm—Klaus J. Bach

[57] ABSTRACT

An infinitely variable transmission has its input and output shafts interconnected by at least two pairs of friction members for the transmission of motion therebetween. One of the members of each pair is a conical sleeve and the other is an ellipsoidal member which is received within the conical sleeve and is in frictional engagement therewith. One of the friction members is eccentrically supported by a support disc which is rotatable about an axis spaced from the axis of the other of the pairs of friction members so that rotation of the support disc changes the angle between the axis of the friction members of each pair so as to change the ratio of motion transmission.

14 Claims, 3 Drawing Figures

INFINITELY VARIABLE TRANSMISSION

This application is a continuation-in-part application of application Ser. No. 198,669, filed Oct. 20, 1980 and now abandoned.

BACKGROUND OF THE INVENTION

1. Field of the Invention

The invention relates to an infinitely variable transmission comprising at least one pair of friction members including a hollow conical body receiving therein an ellipsoidal member which is arranged pivotally relative to the conical body.

2. Description of the Prior Art

A well-known transmission of this type has its output shaft firmly mounted on a support bearing whereas the input shaft and a drive motor associated therewith are mounted pivotally about the axis of the output shaft. In order to change the transmission ratio, it is, consequently, necessary to pivot the motor together with the drive means which is objectionable not only because of the weight of the components involved but also because such an arrangement requires a substantial space which is not always available.

SUMMARY OF THE INVENTION

In order to avoid these disadvantages, it would be desirable for a transmission of this type to have a drive shaft and driven shaft at definite locations relative to each other. This is achieved by the present invention by providing a transmission of the type described in which at least one of the friction members of one pair of cooperating members is eccentrically supported in a rotatable support disc.

With this arrangement the relative positions of the input and output shafts may remain unchanged while only the position of an intermediate member relative to the associated friction member or members is changed in order to adjust the transmission ratio to a desired value. Actually, two relative movable joints are necessary but only one needs to be by friction members while the other may be by means of gears. However, the provision of two friction joints has the advantage that the transmission ratio range between input and output shafts is substantially greater or, that, for a relatively high transmission ratio, the frictional members do not have to be moved into their extreme end positions. As a result, this arrangement provides furthermore for relatively high efficiency since the high efficiency of these transmissions is somewhat reduced only in the extreme end positions of the engaged members relative to each other.

If the axis of the eccentrically supported friction member is parallel to the axis of the support disc supporting the friction member, the transmission arrangement may be relatively simple and inexpensive by the use of spur gears, the input and output shafts being in parallel axial alignment with the support disc such that the friction member supported by said support disc is movable about the axis of the input or the output shaft. If, under certain conditions for obtaining certain transmission ratios, the axis of the eccentrically supported friction member is not parallel to the axis of the support disc, it will be necessary to use bevel gears if the use of gears is desired.

It is also possible to arrange, if desired, input and output shafts at an obtuse angle and to provide such angle between the friction member carrying disc and the shaft associated with the friction member.

It can be seen that it is possible to arrange input and output shafts in any desired predetermined position relative to each other and that the transmission ratio may easily be adjusted by an adjusting member which is easily operable during transmission operation. This permits the use of such a transmission not only as an infinitely variable setpoint transmission but also as an infinitely variable speed control transmission. For such applications, it would be advisable to adjust the support disc by means of a servo motor and to limit the speed of the transmission ratio change, that is, the rotation of the support disc, by means of damping elements. It is also possible to utilize the forces which, in transmissions of the present type, tend to bring the friction members into a stretched position, that is, into a 1:1 transmission ratio position. This, in connection with a damping element, would facilitate to automatically bring a machine up to speed or slowly adjust the speed of a driven member to the speed of a driving member. The transmission according to the invention, due to this inherent automatic behavior, is quite suitable for use as an automatic transmission for vehicles providing for proper transmission ratios during acceleration and also for controlling the motor speed so as to remain at the optimum efficiency range independently of the vehicle speed.

Pivoting of two of a pair of friction members relative to each other will, of course, result in a change of distance between the associated power input and output points, i.e., the distance from another pair of friction members or from the power input or output shafts. As it is known in the art, this change of distances may be accommodated by supporting one of the friction members on its support shaft in such a manner that it is axially movable or, as being proposed herewith, to support the support disc in such a manner that it is axially movable against a force biasing it into one direction. Since the support disc does not participate in the rotation of the members of the transmission for the transmission of power, axial movement of the support disc may be provided for by a relatively simple support structure. It is furthermore possible to provide for a relatively simple manually or power-operated disconnect arrangement with which the members of a pair of friction members may be pulled apart, that is, disengaged, so that power transmission may be interrupted at any transmission ratio. In such arrangement, if provided with a stop member against which the support disc abuts when reaching its end position, the friction members may be disengaged by movement of the support disc to its end position, thereby uncoupling the transmission upon reaching a certain transmission ratio. For recoupling, the position of the stop member may be changed or the transmission ratio may be changed by rotating the support disc.

A relatively simple embodiment of the transmission according to the invention includes two pairs of friction members whose ellipsoids are interconnected by a shaft which is rotatably supported in the support disc along an axis parallel to the disc axis. The arrangement is such that in the greatest ratio position for speed reduction, the pair of friction members at the input end is in the stretched, that is, 1:1 ratio, position whereas the pair of friction members at the output end is in the greatest ratio position for speed reduction, that is, at the greatest angle. Upon rotation of the support disc, the relative positions of the friction members are changed in such a manner that finally, in the other end position, the friction members at the input side are at their greatest angle relative to each other providing for the greatest transmission ratio in a speed increasing sense whereas the friction members at the output end are stretched providing therefor a 1:1 transmission ratio or, overall, the greatest speed increasing transmission ratio. It is desirable to interpose another set of pairs of friction members either at the input or output end of the transmission which makes it not only possible to arrange input and output shafts in parallel alignment with each other but also provides for a highly efficient transmission with large variable transmission ratio. In such four-stage arrangement in which only the input and output shafts and the ellipsoid-carrying shafts need to be supported, intermediate shafts between the ellipsoids and the sleeves of the subsequent friction members are not necessary. Rather, in accordance with the invention, the conical sleeve of one pair of friction members receives an ellipsoid which itself has a conical passage receiving the ellipsoid of another pair of friction members. This results in an improvement not only for the support of various transmission components, that is, the support of two ellipsoids in the space within one outer cone and in a reduction of torsional vibrations, but, further, the transmission becomes very compact.

BRIEF DESCRIPTION OF THE DRAWINGS

The drawings show various embodiments of an infinitely variable transmission, particularly.

DESCRIPTION OF THE PREFERRED EMBODIMENTS

Figure 1:
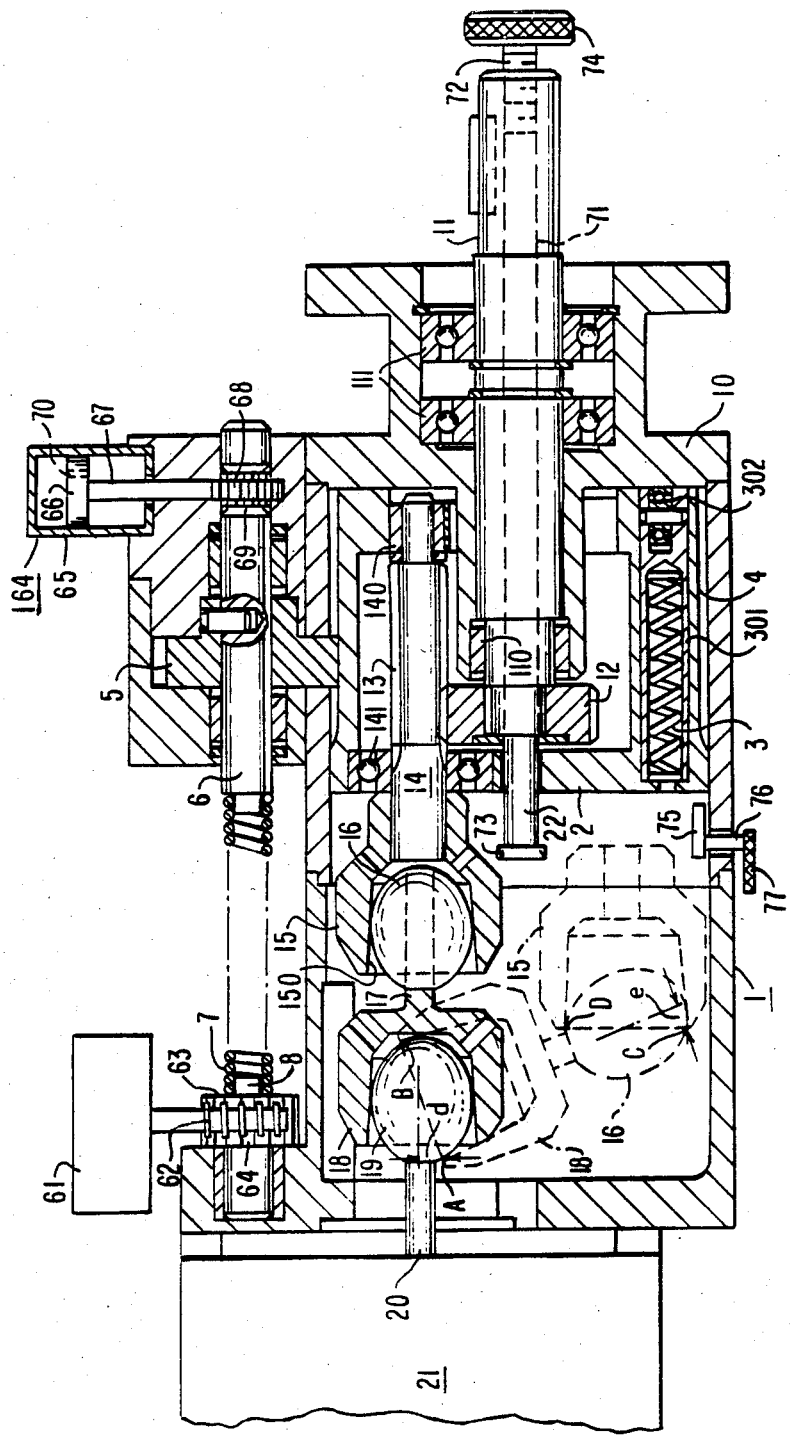
FIG. 1 represents a two-stage transmission with parallel input and output shafts.

Referring to FIG. 1, a transmission housing 1 has a support disc 2 rotatably as well as axially movably disposed therein. Springs 3 are disposed in a pillar 301 slidably mounted in the support disc 2 between the support disc and the front wall 10 of the housing 1 and having a support bearing 302 rotatably supporting the disc 2 against the front wall 10 for forcing the support disc away therefrom. The support disc 2 has a circumferential gear structure 4 which is engaged by a gear 5 mounted on a control shaft 6. The control shaft 6 has one end of a coil spring 7 firmly connected thereto for applying a torque to the control shaft 6. The amount of torque may be adjusted by rotation of the spring holder 8 which has the other end of spring 7 mounted thereto. A gear motor 61 is mounted on the housing 1 and has an output shaft 62 with a worm gear 63 in engagement with a gear structure 64 on spring holder 8 for controlling and adjusting the torque applied by the spring 7 to the control shaft 6.

Figure 2:
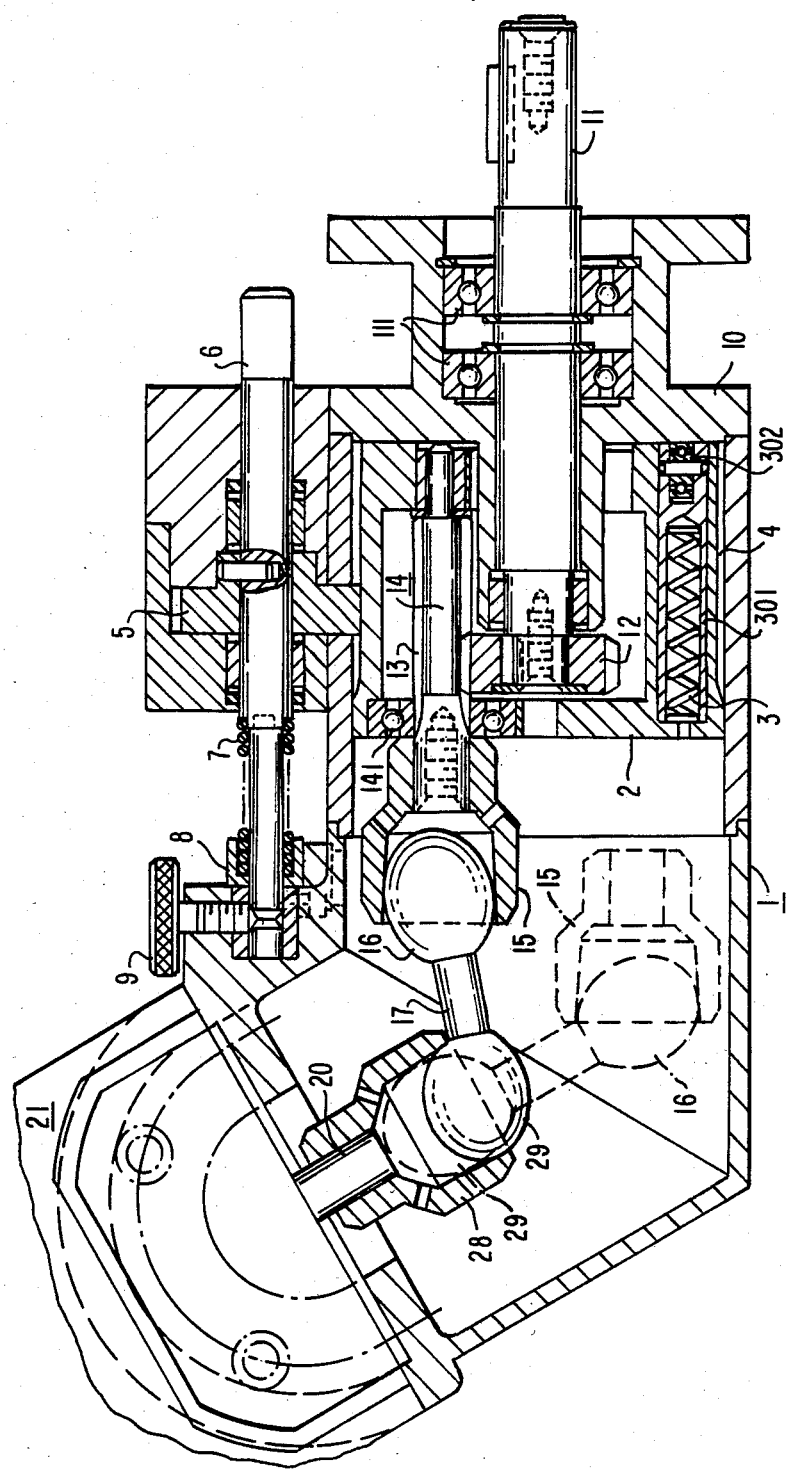
FIG. 2 shows another two-stage transmission with input and output shafts disposed at an angle relative to each other.

However, a torque may be preselected so that it is sufficient to provide means for locking the spring holder 8 in position by way of a clamping bolt 9 as shown in FIG. 2.

The front wall 10 of the housing 1 has an output shaft 11 rotatably supported therein by bearings 110 and 111. The output shaft 11 carries a spur gear 12 which is in engagement with a gear structure 13 on a guide shaft 14 which is rotatably supported in the support disc 2 by bearings 140 and 141 spaced from the output shaft 11.

The guide shaft 14 carries a sleeve 15 having a slightly conical central opening 150. The conical sleeve 15 receives an ellipsoidal member 16 which, on a short intermediate shaft 17, carries another conical sleeve 18. A second ellipsodial member 19 is arranged within the conical sleeve 18 and is mounted on an input shaft 20 of a drive motor 21.

The ellipsoidal members 16, 19 and the conical sleeves 15, 18 are pairs of friction members which are in frictional engagement with each other for the transmission of power. As shown in FIG. 1, both pairs of friction members 19, 18 and 16, 15 are in stretched positions and, consequently, both have a transmission ratio of 1:1 in the position as shown wherein the ellipsoidal members 16, 19 are in contact with the sleeves 15, 18 along a circular line. Motion is transmitted therefore from the motor 21 via drive shaft 20 and ellipsoid 19 to the conical sleeve 18 and further through the intermediate shaft 17 to the ellipsoid 16 and then to the conical sleeve 15. The shaft 14 and gear set 13, 12 transmit motion to the output shaft 11.

In order to change the transmission ratio, the support disc 2 is rotated by means of the control shaft 6. When being rotated the support disc 2 carries along the shaft 14 supported therein and, together therewith, also the conical sleeve 15, the conical sleeve 15 being moved along a circle around the axis of the support disc 2 and the coaxial output shaft 11 while the gears 13 and 12 remain in engagement with each other for the transmission of power from the shaft 14 to the output shaft 11. When being moved by rotation of the disc 2, the conical sleeve 15 takes along the ellipsoid 16 disposed therein so that the ellipsoid 16, shaft 17 and sleeve 18 will be pivoted relative to the ellipsoid 19 or rather the axis of input shaft 20 and the axis of shaft 14. In order to avoid disengagement of the ellipsoids 16 and 19 from the respective conical sleeves 15 and 18 during such pivoting, the support disc 2 is moved axially by the force of the springs 3 such that any reduction of axial distance between the ellipsoid 19 and the conical sleeve 15 is compensated for. As a result, the pairs of friction members remain always in engagement. However, it is possible to simply provide means such as a lever which inhibits axial movement of the support disc at a certain point such that, at this point, transmission of power ceases since there is no longer frictional engagement between the pairs of friction members 15, 16 and 18, 19. As shown in FIG. 1, the inhibiting means is a rod 22 extending through an axial bore 71 in the shaft 11 and being threaded therein at 72 for axial position adjustment of the rod 22. At its inner end, the rod 22 has a stop member 73 for limiting movement of the disc 2 and at its outer end it is provided with an operating knob 74.

Alternatively, there may be provided an arm 75 mounted on a shaft 76 extending through the housing 1 and pivotally supported therein, the shaft 76 having a control lever 77 mounted thereon for adjusting the position of the arm 75 inside the housing 1.

Rotation of the support disc 2 can be continued up to an extreme position which is shown in FIG. 1 in dashed lines. The friction members 15, 16 and 18, 19 of the two sets are then disposed at the maximum angle relative to each other such that, in this position, the transmission ratio is the greatest, providing for a large speed reduction from the input shaft to the output shaft. In the tilted position, the ellipsoidal member 19 is in contact with the conical sleeve 18 only at opposite points A and B which are at a small distance d from the axis of input shaft 20 so that the conical sleeve 18 and ellipsoidal member 16 rotate at a substantially reduced speed and ellipsoidal member 16 is in contact with the conical sleeve 15 only at opposite points C and D which are at a small distance e from the axis of conical sleeve 18 and ellipsoidal member 16 so that the conical sleeve 15 and shaft 14 rotate at an even substantially further reduced speed. The rotation of shaft 14 is transmitted through gears 13, 12 to the output shaft 22 which, consequently, rotates at greatly reduced speed. Further rotation of the support disc 2 beyond the maximum angle or returning of the support disc will bring the components of the transmission to the original position with a transmission ratio of 1:1, any intermediate transmission ratio between the two extreme positions being available.

Since the components of the transmission, as a result of spin friction forces between the friction members, will always be forced into a stretched 1:1 ratio position, any intermediate position needs to be secured by locking of, or maintaining a torque on, the support disc 2. If the support disc 2 is not locked, the components of the transmission will automatically return to a stretched arrangement as shown in FIG. 1.

Rotation of the support disc 2 and the transmission ratio change associated therewith can be supported or inhibited by the torsional force of a coil spring 7, which force is applied to control shaft 6, the gear 5, and finally the support disc 2. Instead of, or in addition to, a spring 7, there may be provided a damping member 164. The damping member 164 consists, for example, of a cylinder 65 having a piston 66 movably disposed therein, the piston 66 having a connecting rod 67 provided with teeth 68 which are in engagement with a gear structure 69 on the control shaft 6 for axial movement of the piston 66 upon rotation of the control shaft 6. The cylinder 65 is filled with an oil and the piston 66 has an orifice 70 extending therethrough for damping its movement. Preferably, there is associated with the control shaft 6 a servo power means such as a gear motor 61 provided with a worm gear 62 in engagement with a spur gear 63 on the spring holder 8 and operated by the signal of a regulator.

Spring 7 is a torsional spring. If it is set to a certain position by the gear motor 61 or by holder 8 and clamp 9 (FIG. 2), it will not prevent rotation of the disc 2. It will, however, counteract the reaction torque applied to the disc 2 by the torque transmitted through the transmission, that is, it will permit rotation of the disc 2 until the torque of spring 7 balances the reaction torque applied to the disc 2. In this manner, the transmission ratio is automatically changed to provide a transmission ratio which generates a predetermined, adjustable torque.

The arrangement as shown in FIG. 2 is very similar to that as described with regard to FIG. 1. Input and output shafts 20 and 11, however, are arranged at an angle and the friction members 15, 16 and 28, 29 are so arranged that the conical sleeves 15, 28 are open toward each other. With this arrangement, the intermediate shaft 17 carries both ellipsoids 16, 29, one at each end of the shaft 17. Each ellipsoidal member 16, 29 is received in one of the conical sleeves 15, 28 so as to form two pairs of friction members 15, 16 and 28, 29. Such an angled arrangement is particularly then advantageous when it is desirable to have the drive motor 21 or input shaft 20 disposed at an angle to the output shaft 11. Furthermore, the torque forces as generated by the spin friction between the ellipsoids 16, 29 and the conical sleeves 15, 28 and taken up by the support disc 2, which torque forces depend on the angle between the axis of the ellipsoid and the respective conical sleeve and have a value changing with the angle in a sine curve, are not in phase so that no high peaks occur but they remain relatively constant over the various transmission ratio settings. If the motor 21 or input shaft 20 should remain in parallel alignment with the output shaft, another pair of angled friction members may be provided.

Figure 3:
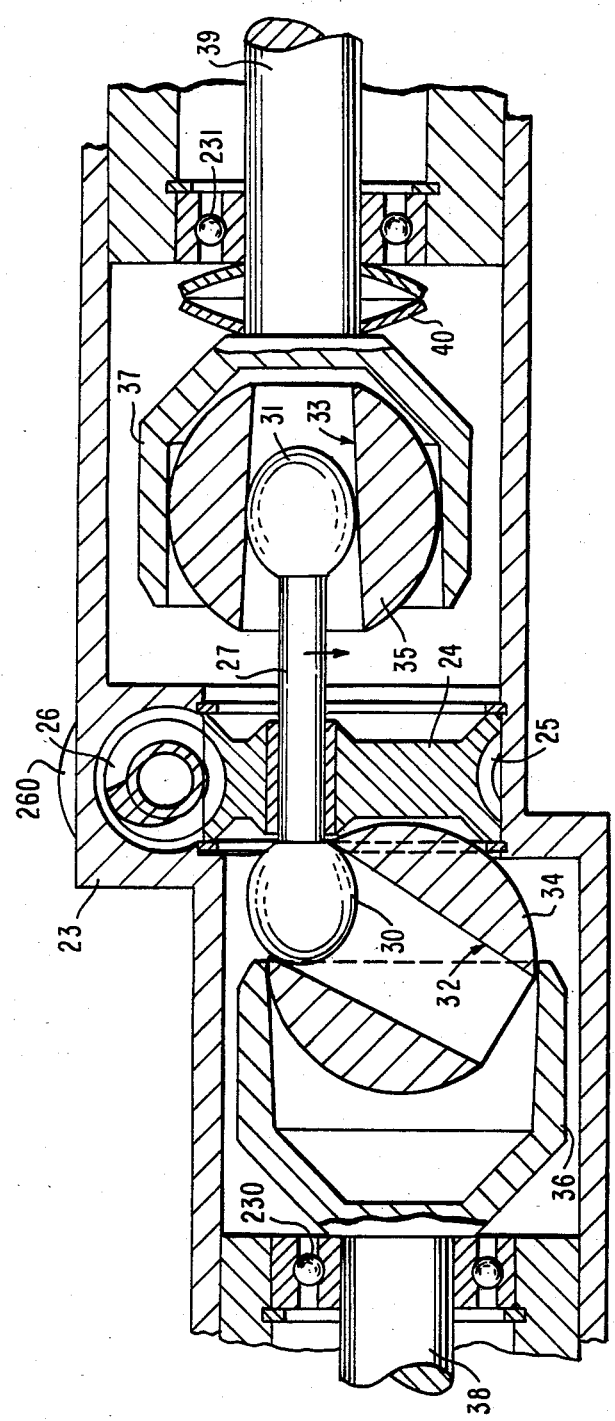
FIG. 3 shows a four-stage transmission.

Another highly advantageous arrangement is shown in FIG. 3. Again, there is a housing 23 including a support disc 24 rotatably supported therein and having a circumferential gear structure 25 engaged by a worm gear 26 operatively connected to a gear motor 260. The support disc 24 has an intermediate shaft 27 axially movably supported therein, the intermediate shaft 27 carrying ellipsoids 30, 31 at its opposite ends. The ellipsoids 30 and 31 are received in conical openings 32, 33 in a second set of ellipsoidal members 34, 35 which are received in conical sleeves 36, 37 in which they are also supported and guided. An input shaft 38 rotatably supported in the housing 23 by a bearing 230 is connected to the conical sleeve 36 and an output shaft 39 rotatably supported in the housing 23 by a bearing 231 is connected to the conical sleeve 37.

If motion is transmitted from a conical sleeve to the ellipsoids, there will be a change to greater rotational speed when sleeve and ellipsoid are angled. If, in the arrangement as shown in FIG. 3, the shaft 38 is the input shaft, the pairs of friction members 34 and 36 are transmitting motion to increase rotational speed and so are the succeeding pairs of friction members 30 and 34. The remaining pairs of friction members 31, 35 and 35, 37 are in a stretched position in which the transmission ratio is 1:1. Rotating of the support disc 24 about 180° by means of the worm gear drive 25, 26 will move the pairs of friction members 30, 34 and 34, 36 into a stretched position, that is, to a transmission ratio of 1:1. At the same time, however, the succeeding pairs of friction members 31, 35 and 35, 37 are moved into angled positions in which both pairs of friction members provide for speed reduction. The full transmission ratio with such an arrangement is, for example, up to 1:20. Any change of axial distance as caused by the tilting of the friction members relative to each other is compensated for by axial movement of the intermediate shaft 27 within the support disc 24. It is noted, however, that, as such axial distance is reduced for one set of friction members, it is increased for the other set of friction members so that the conical sleeves 36 and 37 of the input and output shafts 38 and 39 do not need to be moved. However, one of the conical sleeves, as shown sleeve 37, is axially movable and is forced toward the other by Belleville-type springs 40 providing for an axial force resulting in firm frictional engagement of all friction members with the respective others.

This arrangement also produces a torque on the support disc 24 which is generated by the spin in the four pairs of friction members 30, 34; 31, 35; 34, 36 and 35, 37. Such torque is mainly generated by the spin in the pair of friction members transmitting the largest torque, that is, those with smaller rotational speed. The support disc 24 may, also in the embodiment as shown in FIG. 3, have damping members associated therewith or it may be operated by a servo motor.

What is claimed is:

1. An infinitely variable transmission comprising a housing; input and output shafts rotatably supported in said housing, each of said shafts having an axis; at least one pair of friction members which are pivotal relative to each other, and one being operatively connected to said input shaft, and the other to said output shaft for the transmission of motion therebetween, one of said friction members being a conical sleeve and the other being an ellipsoidal member received in said conical sleeve and being in frictional engagement therewith; a support disc mounted in said housing for rotation about an axis which is spaced from the axis of at least one of said input and output shafts and having one of said friction members eccentrically supported therein for rotation about an axis spaced from the axis of said support disc; means for forcing said friction members toward, and into frictional engagement with, one another; and control means associated with said support disc for rotating said disc for changing the motion transmission ratio between said input and output shafts.

2. A transmission according to claim 1, wherein the axis of the friction member supported by the support disc is parallel to the axis of the support disc.

3. A transmission according to claim 1, wherein the axis of the support disc is parallel to the axis of at least one of the input and output shafts.

4. A transmission according to claim 3, wherein the axis of the support disc is arranged at an obtuse angle to the axis of the other of said input and output shafts.

5. A transmission according to claim 1, wherein the rotational position of said support disc is adjustable by means of a control member and means are provided for locking said control member.

6. A transmission according to claim 1, wherein a servo control motor is operatively associated with said support disc for adjusting the position thereof.

7. A transmission according to claim 1, wherein damping means are operatively associated with said support disc for controlling the speed of rotation thereof.

8. A transmission according to claim 1, wherein spring means are operatively associated with said support disc for biasing said disc in one direction of rotation.

9. A transmission according to claim 1, wherein said support disc is axially movably supported and means are provided for axially biasing said support disc so as to provide frictional engagement of said friction members with one another.

10. A transmission according to claim 9, wherein control means are provided for limiting the axial movement of said support disc.

11. A transmission according to claim 10, wherein said means for limiting the axial movement of said support disc is a control lever having a stop adapted to be engaged by said support disc.

12. A transmission according to claim 1, wherein the ellipsoidal members of two adjacent cooperating pairs of friction members are arranged at opposite ends of a shaft which is supported by said support disc rotatably about an axis parallel to the axis of the support disc.

13. A transmission according to claim 12, wherein at least one of the pairs of friction members has another pair of friction members associated therewith in a power train arrangement.

14. A transmission according to claim 13, wherein there are provided two adjacent pairs of friction members, each comprising a conical sleeve and an ellipsoidal member and the ellipsoidal member of one of the two adjacent pairs of friction members has a conical opening in which the ellipsoidal member of the other of the two adjacent pairs of friction members is received.

* * * * *